US008756157B1

(12) United States Patent
Ledbetter et al.

(10) Patent No.: US 8,756,157 B1
(45) Date of Patent: *Jun. 17, 2014

(54) METHOD FOR PROVIDING A CARD-LINKED OFFER

(71) Applicant: GiftYa LLC, Pittsburgh, PA (US)

(72) Inventors: Patrick Ledbetter, Arlington, VA (US); Adam Ludwig, San Francisco, CA (US)

(73) Assignee: GiftYa LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,969

(22) Filed: Mar. 3, 2014

Related U.S. Application Data

(63) Continuation of application No. 14/193,068, filed on Feb. 28, 2014, which is a continuation of application No. 12/075,655, filed on Mar. 13, 2008, now Pat. No. 8,676,704.

(51) Int. Cl.
G06Q 40/00 (2012.01)

(52) U.S. Cl.
USPC .......... 705/41; 705/42; 705/39; 705/26.1; 705/44; 705/1.1

(58) Field of Classification Search
USPC ........ 705/41, 1.1, 42, 39, 14.26, 26.1, 44, 35, 705/40; 235/379, 380; 713/168
See application file for complete search history.

(56) References Cited

U.S. PATENT DOCUMENTS

| 5,590,196 A | 12/1996 | Moreau |
| 5,794,219 A | 8/1998 | Brown |
| 5,848,396 A | 12/1998 | Gerace |
| 5,861,841 A | 1/1999 | Gildea et al. |
| H1794 H | 4/1999 | Claus |
| 5,963,647 A * | 10/1999 | Downing et al. ............... 705/39 |
| 5,984,180 A | 11/1999 | Albrecht |
| 6,000,608 A | 12/1999 | Dorf |
| 6,014,634 A | 1/2000 | Scroggie et al. |

(Continued)

FOREIGN PATENT DOCUMENTS

| GB | 2376787 | 12/2002 |
| JP | 2002/222377 | 8/2000 |

(Continued)

OTHER PUBLICATIONS

"Developments in cyberbanking" By: Adams, Lee S.; Martz, David J.; Poindexter, Obrea O.—The Business Lawyer 56.3 (May 2001).*

(Continued)

Primary Examiner — John H Holly

(57) ABSTRACT

A system transfers money to a payee's payment card account, without requiring an additional payment card or without acquiring a payee's payment card or account information. A payee registers a payment account with a service provider. A system receives an identification, generated from a business entity, of the payee and information associated with a notice to be transmitted to a device associated with the payee. The system transmits the notice (advertisement or offer) to the device, the notice being associated, prior to the transmitting, with the payee payment account and being transmitted prior to the payee buying product or service associated with the notice using the payee payment account. The system receives receiving an indication of a purchase associated with the notice and completed using the payee payment account and applies an amount of money associated with the notice as a discount.

18 Claims, 4 Drawing Sheets

(56) References Cited

U.S. PATENT DOCUMENTS

| | | |
|---|---|---|
| 6,014,635 A | 1/2000 | Harris et al. |
| 6,044,360 A | 3/2000 | Picciallo |
| 6,068,183 A | 5/2000 | Freeman et al. |
| 6,173,269 B1 | 1/2001 | Solokl et al. |
| 6,175,823 B1 | 1/2001 | Van Dusen |
| 6,182,895 B1 | 2/2001 | Albrecht |
| 6,189,787 B1 | 2/2001 | Dorf |
| 6,330,543 B1 | 12/2001 | Kepecs |
| 6,370,514 B1 | 4/2002 | Messner |
| 6,408,307 B1 | 6/2002 | Semple et al. |
| 6,454,165 B1 | 9/2002 | Dawson |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,594,644 B1 | 7/2003 | Van Dusen |
| 6,601,037 B1 | 7/2003 | Kolls |
| 6,606,602 B1 | 8/2003 | Kolls |
| 6,609,106 B1 | 8/2003 | Robertson |
| 6,672,507 B1 | 1/2004 | Walker et al. |
| 6,711,474 B1 | 3/2004 | Treyz et al. |
| 6,775,539 B2 | 8/2004 | Deshpande |
| 6,795,710 B1 | 9/2004 | Creemer |
| 6,805,289 B2 | 10/2004 | Noriega et al. |
| 6,889,054 B2 | 5/2005 | Himmel et al. |
| 6,947,976 B1 | 9/2005 | Devitt et al. |
| 6,970,871 B1 | 11/2005 | Rayburn |
| 7,010,512 B1 | 3/2006 | Gillin et al. |
| 7,021,531 B2 | 4/2006 | Myttenaere |
| 7,039,601 B2 | 5/2006 | Gary |
| 7,089,208 B1 | 8/2006 | Levchin et al. |
| 7,127,236 B2 | 10/2006 | Khan et al. |
| 7,165,049 B2 | 1/2007 | Slater |
| 7,200,566 B1 | 4/2007 | Moore et al. |
| 7,204,412 B2 | 4/2007 | Foss, Jr. |
| 7,213,027 B1 | 5/2007 | Kominek et al. |
| 7,280,984 B2 | 10/2007 | Phelan, III et al. |
| 7,357,331 B2 | 4/2008 | Blossom |
| 7,512,552 B2 | 3/2009 | Karas et al. |
| 7,559,465 B2 | 7/2009 | Rosenblatt |
| 7,698,221 B2 | 4/2010 | Blinn et al. |
| 7,792,751 B2 | 9/2010 | Tan |
| 7,860,789 B2 | 12/2010 | Hirka et al. |
| 7,861,919 B2 | 1/2011 | Spaeth et al. |
| 7,870,022 B2 | 1/2011 | Bous et al. |
| 7,873,573 B2 | 1/2011 | Realini |
| 8,046,266 B1 | 10/2011 | Geller et al. |
| 2001/0054066 A1 | 12/2001 | Spitzer |
| 2002/0035605 A1 | 3/2002 | McDowell et al. |
| 2002/0040438 A1 | 4/2002 | Fisher, Jr. |
| 2002/0046341 A1 | 4/2002 | Kazaks et al. |
| 2002/0062246 A1 | 5/2002 | Matsubara |
| 2002/0174016 A1 | 11/2002 | Cuervo |
| 2003/0028515 A1 | 2/2003 | Nishikado et al. |
| 2003/0028518 A1 | 2/2003 | Mankoff |
| 2003/0040959 A1 | 2/2003 | Fei et al. |
| 2003/0083941 A1 | 5/2003 | Moran et al. |
| 2003/0130907 A1 | 7/2003 | Karas et al. |
| 2003/0171997 A1 | 9/2003 | Eaton |
| 2003/0182191 A1 | 9/2003 | Oliver et al. |
| 2003/0216960 A1 | 11/2003 | Postrel |
| 2004/0002897 A1 | 1/2004 | Vishik |
| 2004/0073482 A1 | 4/2004 | Wiggins et al. |
| 2004/0089714 A1 | 5/2004 | Raadsen |
| 2004/0111361 A1 | 6/2004 | Griffiths et al. |
| 2004/0148228 A1 | 7/2004 | Kwei |
| 2004/0162775 A1 | 8/2004 | Winklevoss et al. |
| 2004/0203852 A1 | 10/2004 | Janskiraman |
| 2004/0249712 A1 | 12/2004 | Brown et al. |
| 2005/0075932 A1 | 4/2005 | Mankoff |
| 2005/0097005 A1 | 5/2005 | Fargo |
| 2005/0131761 A1 | 6/2005 | Trika et al. |
| 2005/0177493 A1 | 8/2005 | Sung |
| 2005/0197919 A1 | 9/2005 | Robertson |
| 2005/0209958 A1 | 9/2005 | Michelsen et al. |
| 2005/0234771 A1 | 10/2005 | Register et al. |
| 2006/0015405 A1 | 1/2006 | Bala et al. |
| 2006/0074767 A1 | 4/2006 | Fortney et al. |
| 2006/0095338 A1 | 5/2006 | Seidel |
| 2006/0122856 A1 | 6/2006 | Rushton et al. |
| 2006/0178932 A1 | 8/2006 | Lang |
| 2006/0208065 A1 | 9/2006 | Mendelovich et al. |
| 2006/0253320 A1 | 11/2006 | Heywood |
| 2006/0258397 A1 | 11/2006 | Kaplan et al. |
| 2006/0293963 A1 | 12/2006 | Hoblit |
| 2007/0012759 A1 | 1/2007 | Allarea et al. |
| 2007/0017976 A1 | 1/2007 | Peyret et al. |
| 2007/0063020 A1 | 3/2007 | Barrafato |
| 2007/0073589 A1 | 3/2007 | Vergeyle et al. |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |
| 2007/0158413 A1 | 7/2007 | Hastie |
| 2007/0168265 A1 | 7/2007 | Rosenberger |
| 2007/0174120 A1 | 7/2007 | Asmar et al. |
| 2007/0175984 A1 | 8/2007 | Khandaker et al. |
| 2007/0192182 A1 | 8/2007 | Monaco et al. |
| 2007/0210152 A1 | 9/2007 | Read |
| 2007/0255620 A1 | 11/2007 | Tumminaro et al. |
| 2007/0255653 A1 | 11/2007 | Tumminaro et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0004984 A1 | 1/2008 | Sendo et al. |
| 2008/0010114 A1 | 1/2008 | Head |
| 2008/0027820 A1 | 1/2008 | Brill |
| 2008/0033817 A1 | 2/2008 | Billmaier et al. |
| 2008/0033857 A1 | 2/2008 | Moses |
| 2008/0048023 A1 | 2/2008 | Russell et al. |
| 2008/0082424 A1 | 4/2008 | Walton |
| 2008/0091535 A1 | 4/2008 | Heiser et al. |
| 2008/0097851 A1 | 4/2008 | Bemmel et al. |
| 2008/0133257 A1 | 6/2008 | Adkisson et al. |
| 2008/0189189 A1 | 8/2008 | Morgenstern |
| 2008/0223922 A1 | 9/2008 | Weitzman |
| 2008/0235122 A1 | 9/2008 | Weitzman |
| 2008/0255948 A1 | 10/2008 | Garner |
| 2008/0288406 A1 | 11/2008 | Seguin et al. |
| 2008/0301005 A1 | 12/2008 | Nieda et al. |
| 2008/0301044 A1 | 12/2008 | Vardi |
| 2009/0018916 A1 | 1/2009 | Seven et al. |
| 2009/0018959 A1 | 1/2009 | Doran et al. |
| 2009/0032581 A1 | 2/2009 | Esslinger et al. |
| 2009/0048926 A1 | 2/2009 | Salesky et al. |
| 2009/0094134 A1 | 4/2009 | Toomer et al. |
| 2009/0132415 A1 | 5/2009 | Davis et al. |
| 2009/0159698 A1 | 6/2009 | Mullen et al. |
| 2009/0192928 A1 | 7/2009 | Abifaker |
| 2009/0234771 A1 | 9/2009 | Ledbetter et al. |
| 2009/0271265 A1 | 10/2009 | Lay et al. |
| 2009/0287579 A1 | 11/2009 | Walker et al. |
| 2009/0307130 A1 | 12/2009 | Tan |
| 2009/0313109 A1 | 12/2009 | Bous et al. |
| 2009/0327067 A1 | 12/2009 | Berger et al. |
| 2009/0327129 A1 | 12/2009 | Collas et al. |
| 2010/0010918 A1 | 1/2010 | Hunt |
| 2010/0017278 A1 | 1/2010 | Wilen et al. |
| 2010/0023341 A1 | 1/2010 | Ledbetter et al. |
| 2010/0023418 A1 | 1/2010 | Bader et al. |
| 2010/0036524 A1 | 2/2010 | Chirco |
| 2010/0057580 A1 | 3/2010 | Raghunathan |
| 2010/0106592 A1 | 4/2010 | Brown |
| 2010/0299228 A1 | 11/2010 | Smith |
| 2010/0325006 A1 | 12/2010 | White |
| 2011/0004512 A1 | 1/2011 | Postrel |
| 2011/0011931 A1 | 1/2011 | Farley et al. |
| 2011/0295749 A1 | 12/2011 | Scalisi |

(56) References Cited

U.S. PATENT DOCUMENTS

| 2012/0066041 A1 | 3/2012 | Mankoff |
| 2012/0066212 A1 | 3/2012 | Jennings |
| 2012/0197716 A1 | 8/2012 | Rampell et al. |

FOREIGN PATENT DOCUMENTS

| JP | 2002334287 | 11/2002 |
| JP | 2004/265294 | 9/2004 |
| KR | 2002/0070232 | 9/2002 |
| KR | 2002/0094340 | 12/2002 |
| KR | 2004/0076556 | 9/2004 |
| KR | 2006/0061515 | 6/2006 |
| KR | 2006/0083825 | 7/2006 |
| KR | 2007/0030467 | 3/2007 |
| KR | 2010/0045666 | 5/2010 |
| WO | WO 02/73489 | 9/2002 |
| WO | WO 03/014982 | 2/2003 |
| WO | WO 2006/065037 | 6/2006 |

OTHER PUBLICATIONS

"Digital Island Corrects and Replaces Previous News Release, BW2059, CA-DIGITAL-ISLAND",Business Wire, Jan. 22, 2001.
"AOL Digital City Kicks Off Major Expansion to Widen Lead in Fast-Growing Local Online Market", Business Wire, Mar. 21, 2000.
"WindWire Launches WindCaster; Wireless Ad Network Delivers Marketing and Advertising Over the New Wireless Web Medium", Business Wire, Jun. 27, 2000.
Launch of WindWire Undisputed Success; Leader in Wireless Advertising Solutions Serves Over One Million Ads With Click-Through Rates of More Than 15 Percent in First Week of Launch:, Business Wire, Oct. 17, 2000.
"Alcatel Introduces Advanced Version of Its Intelligent Location-Based Server", Canadian Corporate News, Mar. 20, 2001.
"Smart AdServer Targets Quova for Geolocation Needs; Adserving Innovator Switches to Quova for Reliability and Depth of Data", CCNMatthews Newswire, Feb. 5, 2008.
Susan Glairon, "New Marketing Scheme Brings Online Ads to Boulder, Colo., Wireless Customers", Knight Rider/Tribune Business News, Aug. 6, 2000.
Sarah Littman, "On the Verge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.
"Personalized Information to Mobile Users—Add2Phone and Setec to Co-Operate in Mobile E-Commerce", M2 Presswire, Apr. 20, 2000.
Sarah McCammon, "Ladies, It's Your Night for a Bargain (Neighbor)", Daily Herald (Arlington Heights, IL), Feb. 5, 2004.
"The Next Wave in Advertising", New Straits Times, Jul. 2, 2000.
Sanjay Parekh, "Personalization: Turn Browsers Into Buyers: Gathering Customer Intelligence is an art and a Science (Customer Relationship Management)", e-Business Advisor, Sep. 1, 2002.
"[x + 1] Personalizes Web Optimization with New, Patented Technology", PR Newswire, Sep. 18, 2007.
"Power of Real Tune (Brief Article)", Crain's New York Business, Oct. 30, 2000.
Michelle Speir, "BlackBerry pushes a Sweet Solution", Nov. 6, 2000, Federal Computer Week, pp. 40-42.
"Consumers Can Show Their Support for Small Business This Holiday Season on "Small Business Saturday(SM)"". Retrieved from http://about.americanexpress.com/news/pr/2010/sbs.aspx Nov. 28, 2011.

\* cited by examiner

METHOD FOR PROVIDING A CARD-LINKED OFFER

RELATED APPLICATIONS

The present application is a continuation of U.S. patent application Ser. No. 14/193,068, filed Feb. 28, 2014, which is a continuation of U.S. patent application Ser. No. 12/075,655, filed Mar. 13, 2008, the content of which applications is incorporated by reference in their entirety.

BACKGROUND OF THE INVENTION

1. Field of the Invention

The present disclosure relates to a method of transferring funds using a service provider via a card-linked offer. More particularly, the present disclosure relates to a service provider linking a business entity notice or advertisement to a payee payment account such that when a payee makes a purchase using the payee account, money can be transferred to that account according to the notice.

2. Introduction

A gift card is often used when giving money as a gift. A gift card is a substitute for currency, and is often a form of a physical card with an associated stored value. The gift cards may be store-specific or a third party specific, such as a business entity like a credit card company specific. However, using the gift card to give money requires purchasing and delivering the gift card to the recipient. Thus, a gift card often is not a fast way of gifting money. Moreover, a gift card adds an extra card to the giftee's wallet, increasing the giftee's accounts to manage, and it is prone to loss or theft.

Another option when gifting money involves directly depositing the gift amount to the giftee's bank account. However, this does not allow the giftor to direct how the giftee can spend the money. Furthermore, this option requires the giftor to acquire the bank account information of the giftee.

Accordingly, conventional approaches to giving money as gift are not fast and efficient. Thus, there is a need for fast and efficient transfer of money from a giftor's bank account or payment card account to a giftee's bank account or payment card account while giving the giftor the ability to specify a spending category.

SUMMARY

The present disclosure provides a method for transferring an amount of money to a payee's registered payment card account. The focus of this continuation is on payors being a business entity and the notification to the payee being an offer, advertisement, coupon, and the like. The method includes registering at least one payee payment card with a service provider. The at least one payee payment card is associated with at least one payment card account. The method can further include transferring an initial amount of money from at least one payor to the service provider. The service provider stores the initial amount of money. The method also includes storing at least one spending category specified by the at least one payor. The payor can be a business entity who desires to promote their business through advertising or card-linked offers. The service provider checks a transaction history of the at least one registered payment card account for a qualified purchase, wherein the qualified purchase is a purchase matching the at least one spending category. A portion of the initial amount of money is automatically transferred to the at least one registered payee payment card account upon identifying at least one qualified purchase on the transaction history.

In one exemplary embodiment, a system receives an identification, generated by a business entity, of the payee and information associated with a notice (offer or advertisement) to be transmitted to a device associated with the payee and transmits the notice to the device, the notice being associated, prior to the transmitting, with the payee payment card (i.e., a payee account) and being transmitted prior to the payee buying product or service associated with the notice using the payee payment card. The device of the user/payee differs from a point of sale device used the process a purchase. The system receives receiving an indication of a purchase associated with the notice and completed using the payee payment card.

According to an exemplary embodiment, the method may include notifying the payee about the initial amount of money and the at least one spending category. The at least one spending category may include one or more of an individual point of sale, a chain of stores, or a plurality of businesses in a same industry. The method may further include notifying the payee about an identity of the payor. Notifying may comprise one or more of sending an e-mail, sending a text message, sending a voice message or calling the payee.

According to yet another exemplary embodiment, the method may include generating a payee profile with the service provider. The payee profile stores information comprising the initial amount of money, a purchase history and the portion of the initial amount of money transferred to the at least one registered payee payment card account. The method may also include receiving a request from the payee to query the payee profile and providing the information stored on the payee profile to the payee.

According to another exemplary embodiment, the method may include requesting a percentage of the initial amount of money from the one or more payors as a service fee for using the service provider. The method may also include charging a percentage of the initial amount of money to the one or more registered payee payment cards as a service fee for using the service provider. The one or more payors may use a third party to pay the initial amount of money, the third party comprising one or more of a payment card company or an escrow service.

According to yet another exemplary embodiment, the method may include comparing a monetary value of the qualified purchase to the initial amount of money. If the monetary value of the qualified purchase is less than the initial amount of money, the service provider transfers a full amount of the monetary value of the qualified purchase to at least one registered payee payment card account. If the monetary value of the qualified purchase is more than the initial amount of money, the service provider transfers the initial amount of money to the at least one registered payee payment card account.

The present disclosure further provides a method for using a payment card. The method includes registering one or more payment cards with a service provider. The one or more cards are associated with one or more payment card accounts. The method also includes using the registered one or more payment cards for a qualified purchase. The qualified purchase is a purchase matching at least one spending category specified by a payor. The method further includes receiving a transfer of funds to the registered one or more payment card accounts from the service provider. The payor instructs the service provider to transfer funds to the registered one or more payment card accounts.

The present disclosure also provides a method of transferring an amount of money. The method includes registering information about a payee with a service provider. The method also includes transferring an initial amount of money to the service provider. At least one spending category is specified. The method further includes instructing the service provider to pay a portion of the initial amount of money to the payee when the payee makes a qualified purchase with a payment card. The qualified purchase is a purchase matching the at least one spending category.

BRIEF DESCRIPTION OF THE DRAWINGS

These and other aspects of this disclosure will be readily apparent from the detailed description below and the appended drawings, which are meant to illustrate and not to limit the disclosure, and in which.

DETAILED DESCRIPTION

Figure 1:
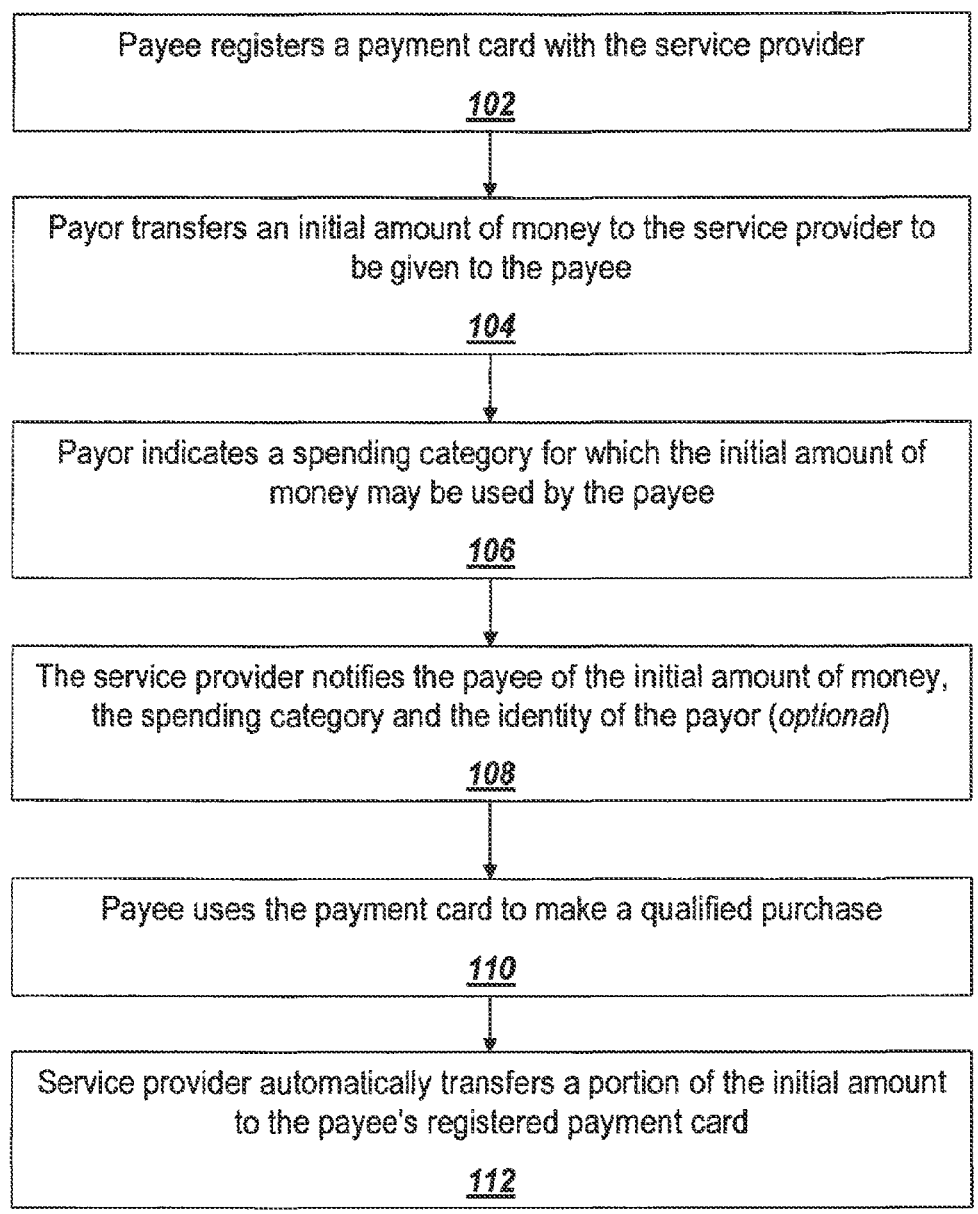
FIG. 1 is a flow diagram depicting exemplary steps taken in transferring money from a payor's account to a payee's payment card account.

The terms "giftor" and "payor" are used throughout the description to indicate the party giving a sum of money to another party. A giftor is a private individual who is a friend or family member (or other person) who manually chooses a gift for the giftee or payee. A payor can be a business entity generating card or account-linked offers or advertisements, which can be automated, for payees which are linked to the payee account.

The terms "giftee," "payee" or "recipient" are used throughout the description to indicate the party receiving the sum of money from another party.

As used herein, the term "payment card" refers to any financial account with transactional activity. A payment card includes, but is not limited to, a credit card, a debit card or a financial account.

The disclosure can be used with different types of money transfer, including but not limited to money transfers as gifts. The use of "gift" in describing the money transfer is for illustrative purposes only and should not be construed as limiting. The gift may be a discount from a merchant or a coupon that is applied when the payee buys something with the payee account.

The present disclosure enables a payor to transfer money to a payee's payment card account, without requiring an additional payment card or without acquiring the payee's payment card information. According to the present disclosure, the payee registers a payment card with a service provider. The payee may register one or more payment cards with the service provider. A payor transfers an initial amount of money to the service provider to be given to the payee. The payor also indicates a spending category to the service provider. A spending category may include one or more of an individual point of sale, a chain of stores, or a plurality of businesses in a same industry such as eating/drinking establishments. The payor may choose a single spending category, a combination of categories or all categories.

When the payee uses the registered payment card for a qualified purchase, a portion of the initial amount of money is transferred to the payee's payment card account. A qualified transaction occurs when a payee uses the registered payment card to make a purchase of the specified spending category.

According to the teachings of the present disclosure, the payor may transfer the initial amount of money to the service provider before the payee registers one or more payment cards with the service provider. In that case, the service provider invites the payee to register one or more of the payee payment cards with the service provider.

The service provider may accept money transfers from multiple payors. The service provider may keep the payor identities private, upon the individual payor's request. Upon receiving the initial amount of money, the service provider stores the initial amount of money until the payee uses the registered payment card to make a qualified use other means.

The service provider monitors the transaction history of the registered payee payment card for qualified purchases. Upon identifying a qualified purchase, the service provider transfers a portion of the initial amount of money to the registered payee payment card account. Alternatively, upon the payee's request, the service provider may transfer a portion of the initial amount of money to a different payment card account that the payee registered with the service provider.

For example, a payor may indicate that the initial amount of money transferred to the service provider may only be used for purchases from the Starbucks® coffee stores. When the payee uses a payment card registered with the service provider to make a purchase from a Starbucks® store, thus a qualified purchase, the service provider transfers a portion of the initial amount of money to the payee's registered payment card account. To determine the portion of the initial amount of money to be transferred to the payee's payment card account, the service provider compares the purchase amount to the initial amount of money. If the purchase amount is less than the initial amount of money, the service provider transfers a portion of the initial amount of money equal to the purchase amount to the payee's registered payment card account. Thus, the payee is reimbursed for the purchase from the Starbucks® store. If the purchase amount is larger than the initial amount of money, the service provider transfers the initial amount of money in full to the payee's payment card account. Thus, the payee is reimbursed the amount of the initial amount of money.

The payee's payment card is initially charged for the full qualified purchase amount just like a regular purchase. Reimbursement, up to the initial amount, is transferred to the payee's payment card account after the service provider identifies that a qualifying charge has appeared on the payee's payment card transaction history.

FIG. 1 illustrates a flow chart 100 depicting exemplary steps taken in transferring money from a payor's account to a payee's payment card account. A payee registers a payment card with the service provider (step 102). The payor transfers an initial amount of money to the service provider to be given to the payee (step 104). The payor further indicates a spending category, an individual point of sale, a chain of stores, or a plurality of businesses in a same industry such as eating/drinking establishments to the service provider for which the payee may spend a portion of the initial amount of money (step 106). The service provider notifies the payee about the initial amount of money and the spending category (step 108). According to one option, the service provider may notify the payee about an identity of the payor (step 108). For example, the service provider may send a text message or a voice message to the payee's cellular phone or the service provider may send an e-mail to the payee's registered email address to notify the payee. When the payee uses the registered payment card to make a qualified purchase (step 110), the service provider automatically transfers a portion of the initial amount of money to the payee's payment card account (step 112). A qualified purchase is a purchase that matches the spending category specified by the payor. This transaction is seamless to the store where the payee makes the purchase.

Figure 2:
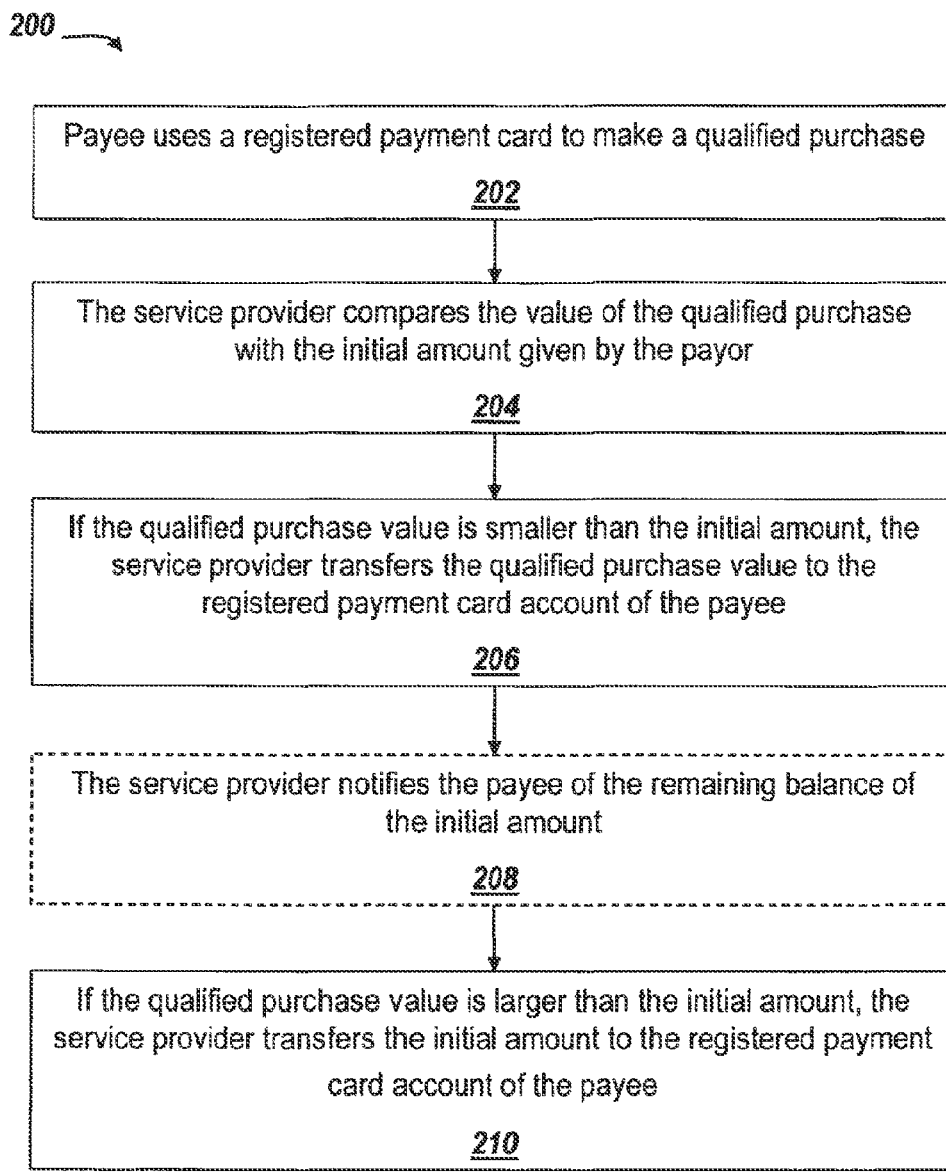
FIG. 2 is a flow diagram depicting exemplary steps taken in assessing the amount of money to be transferred to the payee's payment card account.

FIG. 2 is a flow diagram 200 depicting exemplary steps taken in assessing the amount of money to be transferred to the payee's payment card account. When the payee provider compares the qualified purchase value with the initial amount given by the payor (step 204). If the qualified purchase value is smaller than the initial amount of money, the service provider transfers the qualified purchase value to the registered payment card account of the payee (step 206). According to one option, the service provider may notify the payee of the remaining balance of the initial amount (step 208). If the qualified purchase value is larger than the initial amount of money, the service provider transfers the initial amount of money in full to the registered payment card account of the payee (step 210).

Figure 3:
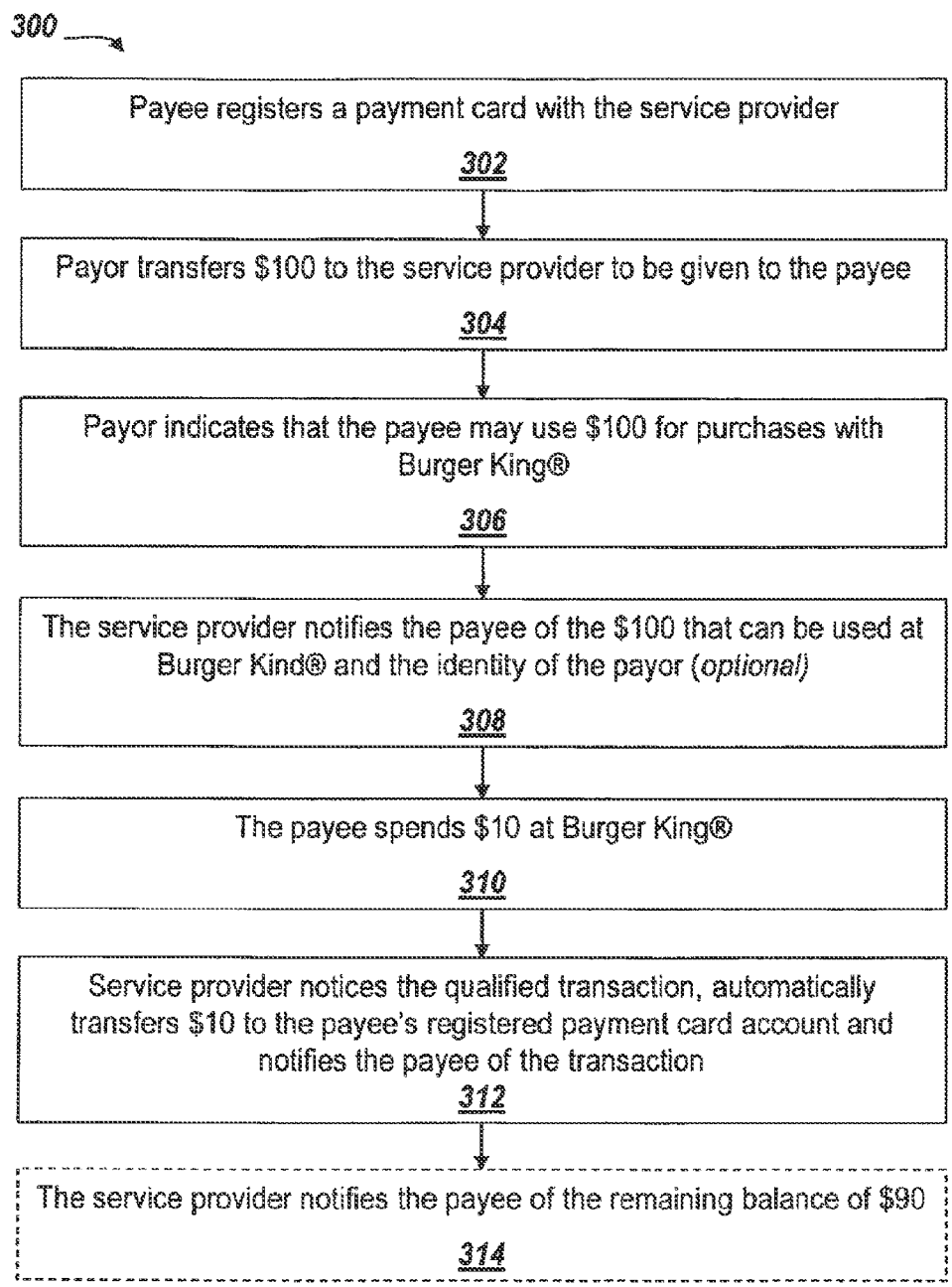
FIG. 3 is a flow diagram depicting an exemplary application of transferring money according to the present disclosure where the purchase value is less than the initial amount of money.

FIG. 3 illustrates a flow diagram 300 depicting an exemplary application of the present disclosure. The payee registers a payment card with the service provider (step 302). The payor transfers an initial amount of money, $100, to the service provider to be given to the payee (step 304). The payor also indicates a chain of stores, e.g., Burger King®, to the service provider for which the payee may spend $100 given by the payor (step 306). The service provider notifies the payee of the $100 that can be spent at Burger King® stores (step 308). The offer and data about the money and associated with a notice is linked to the payee account so that the payee does not have to do anything by way of clicking on an offer or interacting with the device to redeem the offer. The notice can be sent without any input from the user and is not based on any request for a communication from the user. Upon the request of the payor, the service provider may also notify the payee of the identity of the payor (step 308). However, the payor may chose to remain anonymous. Because the notice is connected to the payee account, the payee does not have to interact with the notice by "accepting" or clicking on anything to activate or further the redemption process. In one aspect, the system could require the payee to do some interaction, but the notice is already linked to the payee account to avoid the requirement of interaction for redeeming the notice. When the payee uses the registered payment card to make a purchase of $10 from a Burger King® store (step 310), the service provider identifies the qualified transaction on the payee's payment card transaction history and automatically transfers $10 to the payee's registered payment card account (step 312). The service provider also notifies the payee of the transaction of $10 (step 312). For example, the service provider may send a text message or a voice message to the payee's cellular phone or an email to the payee's email address indicating that the payee has been reimbursed for $10 spent at the Burger King®. According to one option, the service provider may also notify the payee of the remaining balance, e.g. $90 (step 314).

The payor may transfer the money to the service provider using a third party service provider, e.g., a payment card or an escrow service. For example, the payor may use PayPal® to transfer the initial amount of money to the service provider. The third party may charge a fee to the payor for using the services. Similarly, the service provider may also charge a fee to the payor for using its services. The fee may be a percentage of the initial amount of money. The fee may also be a fixed amount of money. Alternatively, the service provider may charge the usage fee to the payee or to the third party. The service provider may earn an interest on the initial amount of money or an unused portion of the initial amount of money. However, the service provider transfers available funds to the payee in a timely manner once the payee uses the registered payment card for a qualifying purchase.

Figure 4:
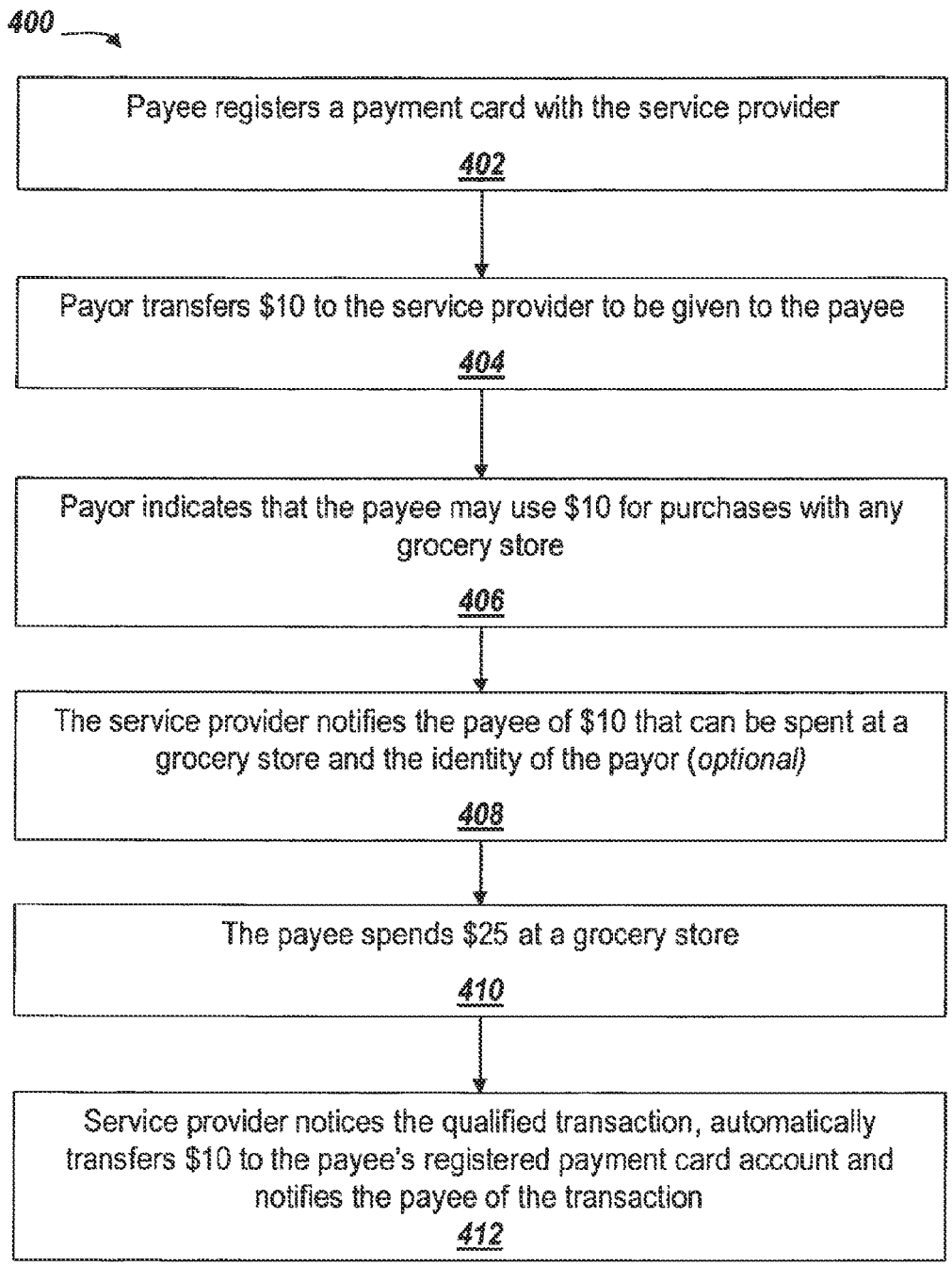
FIG. 4 is a flow diagram depicting another exemplary application of transferring money according to the present disclosure, where the purchase value is more than the initial amount of money.

FIG. 4 illustrates a flow diagram 400 depicting another exemplary application of the present disclosure. The payee registers a payment card with the service provider (step 402). The payor transfers an initial amount of money, $10, to the service provider to be given to the payee (step 404). The payor also indicates a spending category, e.g., any grocery store, to the service provider for which the payee may spend $10 given by the payor (step 406). The service provider notifies the payee of $10 via a notice or offer that can be spent at any grocery store (step 408). The service provider links the offer or notice to the payee account such that the payee does not have to interact with the device (although they can) to redeem the offer. They just need to make a purchase associated with the spending category using the payee account, and the offer will be redeemed without any other necessary action by the payee. Upon the request of the payor, the service provider may also notify the payee of the identity of the payor (step 408). When the payee uses the registered payment card to make a purchase of $25 from a grocery store (step 410), the service provider identifies the qualified transaction on the payee's payment card transaction history and automatically transfers $10 to the payee's registered payment card account (step 412). The service provider also notifies the payee of the transaction of $10 (step 412). For example, the service provider may send a text message or a voice message to the payee's cellular phone or an email to the payee's email address indicating that the payee has been reimbursed for $10 spent at the grocery store. In this way, the payee can redeem an offer or gift card by merely shopping in the normal fashion using their existing payment account without the need to use any code or physical coupon, separate gift card, or any other approach than making the purchase in the standard way.

A system embodiment includes a processor (a computer processor as is generally known in the art) and a computer-readable storage medium or device, which stores instructions which, when executed by the processor, cause the processor to perform operations disclosed herein. A computer-readable storage medium or storage device embodiment covers the medium or device as is generally known in the art that stores instructions which, when executed by a processor, cause the processor to perform operations disclosed herein. Such a computer-readable storage medium or device excludes signals per se, energy per se, and any other non-statutory subject matter.

The present disclosure is directed to a first party giving money to a second party without giving an extra physical gift card to the second party or without requiring the financial information of the second party. This continuation application provides several clarifying comments over the parent case with respect to the giftor and the payor (or the first party). The giftor can be a friend or family member giving a gift to the payee. The payor can be a business entity such as a merchant, payment card company, or credit card/debit card company providing the notice as an advertisement, offer or coupon to the payee. The present disclosure focuses on the payor or first party being a business entity and while making that clarification, does not add new matter in the present case as the parent case disclosed giftors as well as generic payors and first parties, including references to a "payment card company" providing a payment to the payee. While the disclosure has been shown and described with reference to specific preferred embodiments, it should be understood by those skilled in the art that various changes in form and detail may be made therein without departing from the spirit and scope of the disclosure as defined by the following claims.

We claim:

1. A method comprising:
   receiving a registration of a payee account at a service provider, the payee account being associated with a payee;
   receiving an identification, originating from a business entity, of a payee and a spending category associated with a notice;
   transmitting, via a processor of a computing device and independent of any user request for a communication, the notice to a device associated with the payee, the notice being linked, prior to the transmitting, with the payee account;
   monitoring, via a processor of a computing device, purchases using the payee account for a qualified purchase according to the spending category associated with the notice;
   receiving an indication that the qualified purchase was made using the payee account; and
   based on the indication of the qualified purchase, applying, via the processor of the computing device, an amount of money.

2. The method of claim 1, wherein the point of sale device differs from the device.

3. The method of claim 1, wherein the notice comprises one of an advertisement, an offer and a coupon.

4. The method of claim 1, wherein applying the amount of money comprises reimbursing the payee account with the amount of money.

5. The method of claim 1, wherein the amount of money is a discount associated with the qualified purchase.

6. The method of claim 1, wherein the amount of money is applied at a point of sale where the qualified purchase occurred.

7. A system comprising:
   a processor of a computing device; and
   a non-transitory computer-readable storage medium storing instruction which, when executed by the processor of the computing device, cause the processor of the computing device to perform operations comprising:
   receiving a registration of a payee account at a service provider, the payee account being associated with a payee;
   receiving an identification, originating from a business entity, of a payee and a spending category associated with a notice;
   transmitting, independent of any user request for a communication, the notice to a device associated with the payee, the notice being linked, prior to the transmitting, with the payee account;
   monitoring purchases using the payee account for a qualified purchase according to the spending category associated with the notice;
   receiving an indication that the qualified purchase was made using the payee account; and
   based on the indication of the qualified purchase, applying an amount of money.

8. The system of claim 7, wherein the point of sale device differs from the device.

9. The system of claim 7, wherein the notice comprises one of an advertisement, an offer and a coupon.

10. The system of claim 7, wherein applying the amount of money comprises reimbursing the payee account with the amount of money.

11. The system of claim 7, wherein the amount of money is a discount associated with the qualified purchase.

12. The system of claim 7, wherein the amount of money is applied at a point of sale where the qualified purchase occurred.

13. A non-transitory computer-readable storage device storing instructions which, when executed by a processor of a computing device, cause the processor of the computing device to perform operations comprising:
   receiving a registration of a payee account at a service provider, the payee account being associated with a payee;
   receiving an identification, originating from a business entity, of a payee and a spending category associated with a notice;
   transmitting, independent of any user request for a communication, the notice to a device associated with the payee, the notice being linked, prior to the transmitting, with the payee account;
   monitoring purchases using the payee account for a qualified purchase according to the spending category associated with the notice;
   receiving an indication that the qualified purchase was made using the payee account; and
   based on the indication of the qualified purchase, applying an amount of money.

14. The non-transitory computer-readable storage device of claim 13, wherein the point of sale device differs from the device.

15. The non-transitory computer-readable storage device of claim 13, wherein the notice comprises one of an advertisement, an offer and a coupon.

16. The non-transitory computer-readable storage device of claim 13, wherein applying the amount of money comprises reimbursing the payee account with the amount of money.

17. The non-transitory computer-readable storage device of claim 13, wherein the amount of money is a discount associated with the qualified purchase.

18. The non-transitory computer-readable storage device of claim 13, wherein the amount of money is applied at a point of sale where the qualified purchase occurred.

* * * * *

UNITED STATES PATENT AND TRADEMARK OFFICE
CERTIFICATE OF CORRECTION

| | | |
|---|---|---|
| PATENT NO. | : 8,756,157 B1 | Page 1 of 4 |
| APPLICATION NO. | : 14/194969 | |
| DATED | : June 17, 2014 | |
| INVENTOR(S) | : Patrick Ledbetter and Adam Ludwig | |

It is certified that error appears in the above-identified patent and that said Letters Patent is hereby corrected as shown below:

On the title page, under abstract "18 Claims, 4 Drawing Sheets" should read

-- 15 Claims, 4 Drawing Sheets --

In the Claims

Columns 7-8, lines 9-56,

Claim 1 should read as follows:

-- 1. A method comprising:

receiving a registration of a payee account at a service provider, the payee account being associated with a payee;

receiving an identification, originating from a business entity, of the payee and a spending category associated with a notice;

transmitting, via a processor of a computing device, the notice to a device associated with the payee, the notice being linked with the payee account;

monitoring, via a processor of a computing device, purchases using the payee account for a qualified purchase according to the spending category associated with the notice;

receiving an indication that the qualified purchase was made using the payee account; and based on the indication of the qualified purchase, applying, via a processor of a computing Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,756,157 B1 device, an amount of money. --

Claim 2 should be cancelled.

Claim 3 should be renumbered as claim 2 as follows:

-- 2. The method of claim 1, wherein the notice comprises one of an advertisement, an offer and a coupon. --

Claim 4 should be renumbered as claim 3 as follows:

-- 3. The method of claim 1, wherein applying the amount of money comprises reimbursing the payee account with the amount of money. --

Claim 5 should be renumbered as claim 4 as follows:

-- 4. The method of claim 1, wherein the amount of money is a discount associated with the qualified purchase. --

Claim 6 should be renumbered as claim 5 as follows:

-- 5. The method of claim 1, wherein the amount of money is applied at a point of sale where the qualified purchase occurred. --

Claim 7 should be renumbered as claim 6 and read as follows:

-- 6. A system comprising:

a processor of a computing device; and a non-transitory computer-readable storage medium storing instruction which, when executed by the processor of the computing device, cause the processor of the computing device to perform operations comprising:

receiving a registration of a payee account at a service provider, the payee account being associated with a payee;

receiving an identification, originating from a business entity, of the payee and a spending category associated with a notice;

transmitting the notice to a device associated with the payee, the notice being linked with the payee account;

monitoring purchases using the payee account for a qualified purchase according to the spending category associated with the notice;

receiving an indication that the qualified purchase was made using the payee account; and based on the indication of the qualified purchase, applying an amount of money. --

Claim 8 should be cancelled.

Claim 9 should be renumbered as claim 7 and read as follows:

-- 7. The system of claim 6, wherein the notice comprises one of an advertisement, an offer and a coupon. --

Claim 10 should be renumbered as claim 8 and read as follows:

-- 8. The system of claim 6, wherein applying the amount of money comprises reimbursing the payee account with the amount of money. --

Claim 11 should be renumbered as claim 9 and read as follows:

-- 9. The system of claim 6, wherein the amount of money is a discount associated with the qualified purchase. --

Claim 12 should be renumbered as claim 10 and read as follows:

-- 10. The system of claim 6, wherein the amount of money is applied at a point of sale where the qualified purchase occurred. --

Claim 13 should be renumbered as claim 11 and read as follows:

-- 11. A non-transitory computer-readable storage device storing instructions which, when executed by a processor of a computing device, cause the processor of the computing device to perform operations comprising:

receiving a registration of a payee account at a service provider, the payee account being associated with a payee;

receiving an identification, originating from a business entity, of the payee and a spending category associated with a notice;

transmitting the notice to a device associated with the payee, the notice being linked with the payee account;

monitoring purchases using the payee account for a qualified purchase according to the spending category associated with the notice;

receiving an indication that the qualified purchase was made using the payee account; and based on the indication of the qualified purchase, applying an amount of money. --

Claim 14 should be cancelled.

Claim 15 should be renumbered as claim 12 and read as follows:

-- 12. The non-transitory computer-readable storage device of claim 11, wherein the notice comprises one of an advertisement, an offer and a coupon. --

Claim 16 should be renumbered as claim 13 and read as follows:

-- 13. The non-transitory computer-readable storage device of claim 11, wherein applying the amount of money comprises reimbursing the payee account with the amount of money. --

Claim 17 should be renumbered as claim 14 and read as follows:

-- 14. The non-transitory computer-readable storage device of claim 11, wherein the amount of money is a discount associated with the qualified purchase. --

Claim 18 should be renumbered as claim 15 and read as follows:

-- 15. The non-transitory computer-readable storage device of claim 11, wherein the amount of money is applied at a point of sale where the qualified purchase occurred. --